J. KROHN.
VEHICLE DRIVE MECHANISM.
APPLICATION FILED MAR. 22, 1917.

1,399,019.

Patented Dec. 6, 1921.
5 SHEETS—SHEET 1.

J. KROHN.
VEHICLE DRIVE MECHANISM.
APPLICATION FILED MAR. 22, 1917.
1,399,019.
Patented Dec. 6, 1921.
5 SHEETS—SHEET 2.
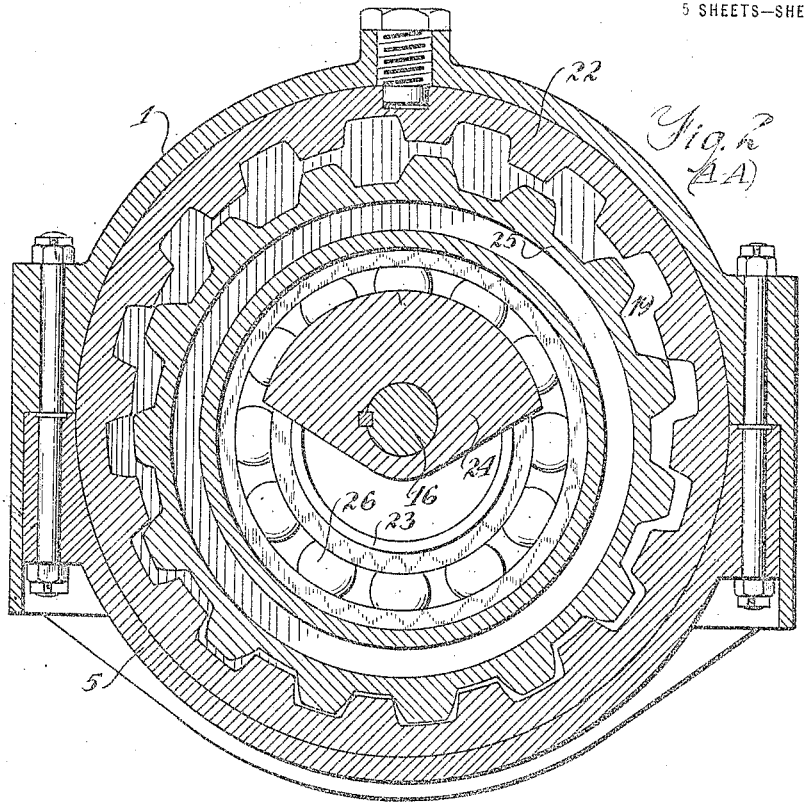
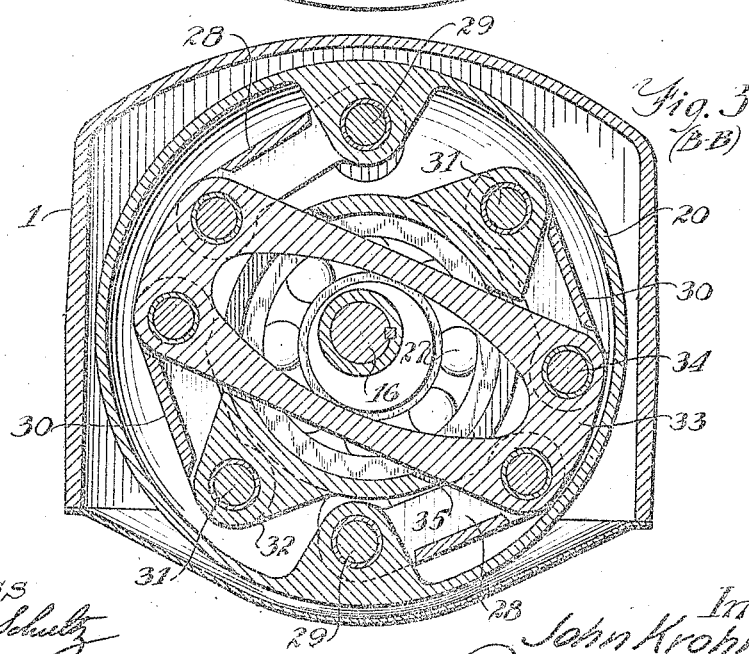

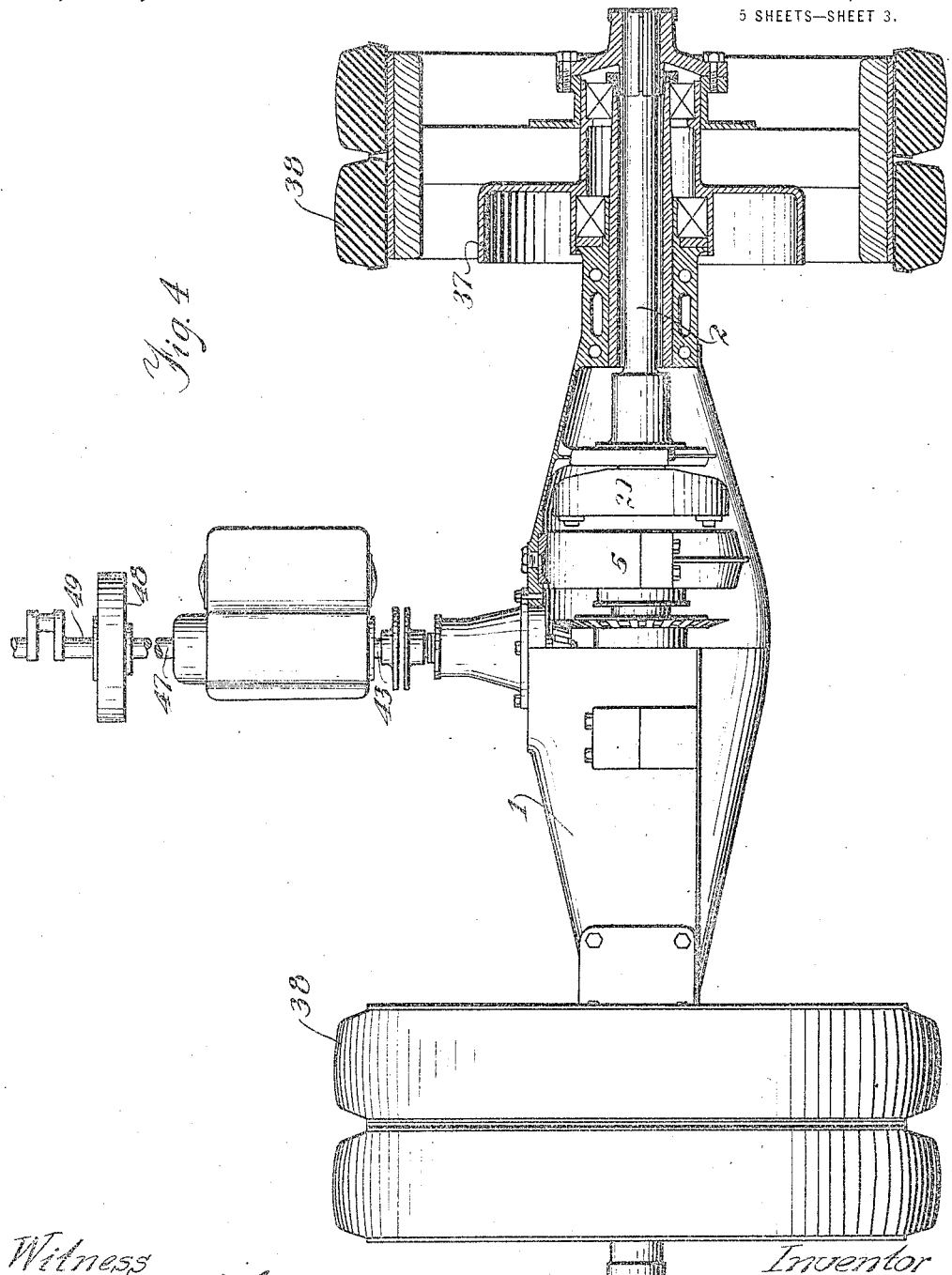

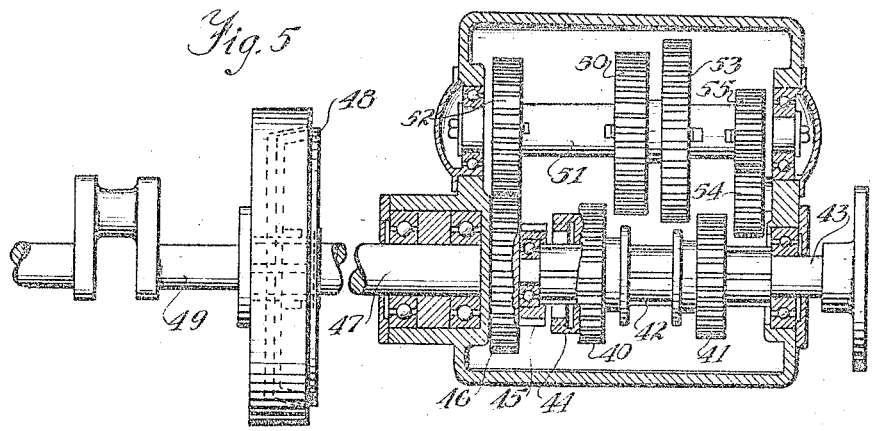
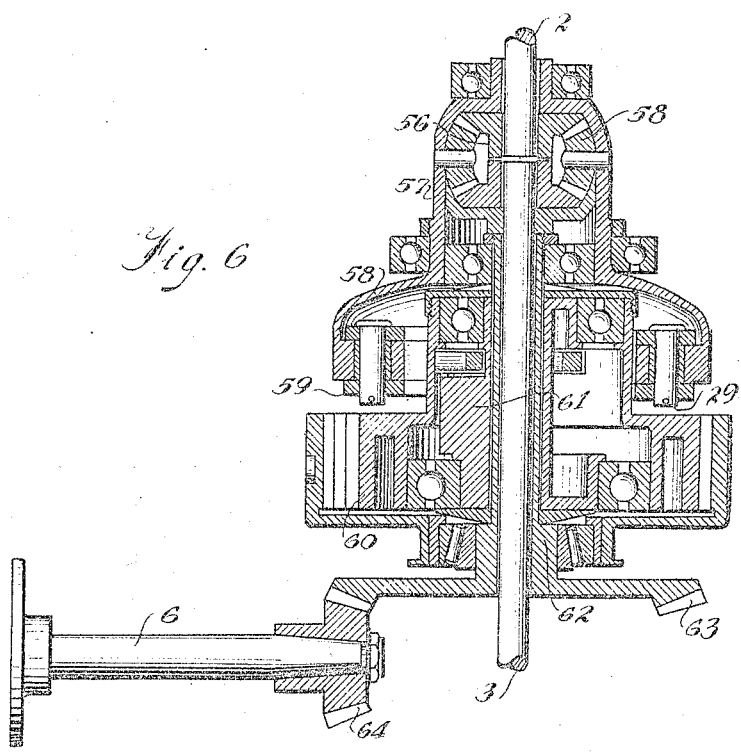

UNITED STATES PATENT OFFICE.

JOHN KROHN, OF SAN MARTIN, CALIFORNIA.

VEHICLE DRIVE MECHANISM.

1,399,019.　　　　Specification of Letters Patent.　　Patented Dec. 6, 1921.

Application filed March 22, 1917. Serial No. 156,621.

*To all whom it may concern:*

Be it known that I, JOHN KROHN, a citizen of the United States of America, and a resident of San Martin, California, have invented certain new and useful Improvements in Vehicle Drive Mechanisms, of which the following is a specification.

This invention relates to an improved drive mechanism for power vehicles, particularly heavy trucks or tractors.

The objects of the invention are to provide for a considerable reduction in speed between the power shaft and the driven shafts without necessitating the employment in the transmission of any considerable number of gears, which would result in the loss of power; to arrange a transmission gearing between the motor and the driven shafts in such manner that the heaviest work at slowest vehicle speeds may be accomplished on the direct drive from the motor to the driven axles of the vehicle; to provide a unitary construction of transmission mechanism all mounted on the rear axle in axial alinement therewith and inclosed in a housing to insure the retention of oil in the mechanism and protect the same against dirt and water; to provide a transmission mechanism of comparatively small dimensions, silent in operation, and of the highest mechanical efficiency; to provide means for changing the gear ratios without changing the general dimensions of the gears; and to provide an eccentric gear reduction as the final permanent drive between the motor and the driven wheels.

An illustrative embodiment of the invention is shown in the accompanying drawings, in which—

Fig. 2 is a sectional detail on the line A—A of Fig. 1.

Fig. 3 is a sectional detail on the line B—B of Fig. 1.

Fig. 4 shows a general assembly, partly in section, of the drive mechanism.

Fig. 5 is a detail in plan of the transmission gearing.

Fig. 6 is a sectional plan view of the modified form of the drive wherein but a single pair of eccentric reduction gears is employed.

Figure 1:
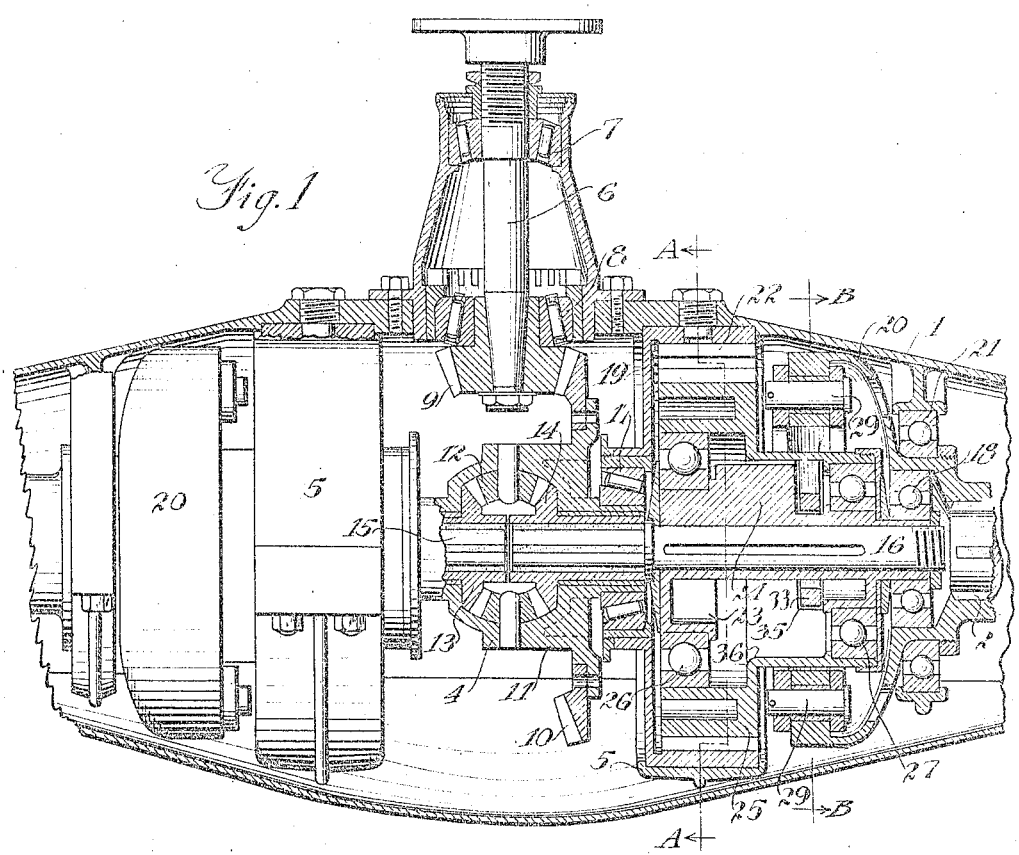
Figure 1 shows in plan, partly broken away and in section, the improved transmission mechanism.

In the development of transmission mechanism for motor vehicles, in which a large reduction between the motor and the driven wheels is essential, such as in heavy trucks and tractors, it has been generally learned that the ordinary forms of speed reducing means such as chains and uninclosed gears are for many reasons unsatisfactory. Such arrangements resulted in noise and loss of power, due not only to the intrinsic friction, but from dirt working into the mechanism. In the past, such arrangements of transmission mechanism were more or less successful, due mainly to the fact that motors were not designed to run at the high speeds which are now preferable. The ordinary arrangement of chains and gears in tractors which provide for large reductions, does so by having the gears of large dimensions and necessitates leaving them uninclosed and exposed to dust, dirt and water. Farm tractors, in particular, must operate under the most unfavorable conditions, and accordingly, with the uninclosed mechanism, the losses in power are considerable.

It is well understood that these losses may be reduced by decreasing the number of gears employed in the transmission, but since the reductions are frequently so great, such as 40 to 1, or even 100 to 1, they cannot practically be brought about by a single pair of gears, unless either worm gearing or eccentric gearing is employed. Worm gearing, with the single thread worm of small lead angle, which is required for such great reductions, is very inefficient, due to the thrust developed and the rubbing action between the threads. It also has the great disadvantage, that a vehicle equipped with it would not coast; that is, the worm wheel would not drive the worms. Such objections do not apply to eccentric gearing. The present invention relates to an improved arrangement of the latter type of gearing.

In the arrangement shown in the drawings, it is possible with few gears to transmit the power of the motor at its highest speed to the driven wheels at their intended slowest speed, or in other words, transmit the highest motor speeds at slowest vehicle speeds, through the minimum number of gears. This is particularly important when the load carried is great. In some classes of vehicles, it is preferred to deliver the maximum power at slowest speeds, and if necessary to sacrifice power, to do so at the high speeds, since such vehicles are driven at the higher speeds only when carrying little or no load. In the majority of motor vehicles of the lighter types and also in many heavy tractors, it is customary to have a number of speed changing or speed varying gear sets, called transmission gears, the function of which is to provide gear ratios best suited to the motor under varying load conditions, and also for effecting reverse motion of the vehicle. These gear sets are ordinarily of such proportions that they afford a number of reductions in a progressive order, say from 0 to 3 to 1. This speed changing transmission is generally interposed between the motor and the final, permanent gear reduction of the driving wheels and through it, additional reductions can be obtained if desired, but it will be seen that by such an arrangement, the greater the reduction, the greater are the number of gears interposed between the motor and the driven wheels, and therefore the friction or gear losses are greatest when the load is greatest and the gear losses can be least afforded, because the vehicles are driven at their slowest speeds when carrying heavy loads.

Therefore, when it became necessary to transmit highest motor speeds at slowest vehicle speeds, it resulted in the heaviest driving stresses being transmitted through at least two additional pairs of gears, thus lowering the over all efficiency of transmission.

With the present improved construction, it is possible to obtain the largest gear reduction required by the permanent, final drive reduction, without resorting to the additional reductions possible in speed changing transmission. Thus, the heaviest work at slowest vehicle speeds may be accomplished on a direct drive at maximum gear efficiency, and inasmuch as most of the work which the larger trucks and tractors perform is at maximum power and slowest vehicle speed, the elimination of the transmission or speed changing gears under these conditions is desirable. The usual speed changing gears are employed in the present combination, but their relationship to the final gear reduction is reversed from normal. The speed changing gears are brought into operation to step up speeds, rather than reducing the speeds. The result is that with the heaviest work, the minimum number of gears are in action.

In the drawings, the housing 1, within which are journaled the driven wheel axles 2 and 3, contains the usual form of differential gearing 4 and at each side thereof an eccentric gear reduction unit 5. The power shaft 6 is journaled in bearings 7 and 8 in the housing 1 and carries a beveled gear 9 meshing with a beveled gear 10 which is secured to the rotatable housing 11 of the differential gearing. This housing carries a plurality of beveled pinions 12 meshing with the beveled gears 13 and 14 respectively keyed to the shafts 15 and 16 mounted in alinement with the axles 2 and 3. The bearings 17 and 18 maintain the shafts 15 and 16 in proper alinement. The bearings 17 are supported by an annular casing 19 which is bolted to the housing 1. The bearings 18 are mounted within annular rotatable bell-shaped members 20 respectively secured to the axles 2 and 3 and in turn supported in bearings 21 in the casing 1.

The eccentric gear reduction units 5 each comprise a stationary internal gear 22 secured within the casing 19. The shafts 15 and 16 have keyed thereto eccentrics 23 which are counterweighted at 24, and each supports an external gear 25 meshing with one of the internal gears 22. The counterweight 24 is such that the weight of the eccentric and the internal gear are practically equally balanced on all sides of the center about which they revolve, and the bearings 26 and 27 are located on each side of the counterweight 24 so as to maintain a more perfect axial alinement of the shaft 16 and thereby eliminate the strains and vibrations that would occur if there were no counterweight or if the counterweighted eccentric had but a single bearing at one side of the counterweight. Suitable bearings 26 and 27 are provided between each of the eccentrics and the external gear 25 rotatably mounted thereon. With this construction, it may be seen that the rotation imparted to the shafts 15 and 16 through the differential gearing 4 will cause the external gears 25 to roll within the internal gears 22, which are of somewhat larger diameter. The rate of rolling is dependent upon the pitch diameter differences between the two gears. Assuming that there are fifteen teeth in the internal gear and sixteen teeth in the external gear, each rotation of the shaft 15 or 16 will cause the corresponding gear 25 to rotate one tooth space, or one-fifteenth of its circumference. This ratio between the gears 25 and 22 may be varied within wide limits without changing the diameter of one of them, but by providing any desired number of teeth therein and arranging the gear with the desired different number of teeth. Thus, the diameter of the gear 25 may be altered more or less, while the diameter of the gear 22 remains substantially the same or vice versa. The rotation of the gears 25 is transmitted to the axles 2 and 3 by a novel arrangement of links which are silent in operation and provide a well balanced mechanism which will permit the gears 25 to have an eccentric movement while transmitting their rotational motion only to the driven axles. This mechanism comprises a pair of links 28 pivotally mounted at 29 to the members 20 which are secured to the driven axles. Similar links 30 are pivoted at 31 to ears 32 integral with the gears 25. All of the links are connected together at their opposite ends by a plate 33 having pivotal connections 34 with the links. The plate 33 is suitably cut away at its central portion for the purpose of encircling the shafts 15 or 16, and slots 35 are provided within the hub portions 36 of the gears 25 between the bearings 26 and 27 and through which the plates 33 pass with the required clearance. The links 28 and 30 are each of yoke formation, with their bearing ends respectively straddling the ears on the member 20 and gears 25. The ends of the plate 33 are likewise straddled by the links.

The speed changing or transmission gears, as shown in Fig. 5, are the same in principle of construction as those now commonly employed in motor vehicles, except that the relative sizes of the different gears are such that when brought into action on changing from direct drive to other speeds, the speed changing gears serve to multiply the motion transmitted to the driven shaft. The gears 40 and 41 are shiftable along splines 42 of the driven shaft 43. The shaft 43 is as usual connected to the drive shaft 6, Fig. 1. The gear 40 is rigid with a clutch member 44 by means of which it may be connected with the clutch member 45 rigid with a gear 46 fast to the shaft 47. The latter, through the clutch 48, may be connected to the engine shaft 49. When the clutch members 44 and 45 are in engagement, power is transmitted direct from the engine to the shaft 43, but when the gear 40 is shifted to disengage the clutches 44 and 45 and into position to mesh with the gear 50 on the jackshaft 51, the power is transmitted from the shaft 47 to the shaft 43 through the gears 46, 52, 50 and 40, at a speed considerably greater than that normally transmitted on a direct drive. An intermediate speed may be attained by permitting the gear 40 to remain in the position shown in Fig. 5, and shifting the gear 41 into engagement with the gear 53 fast to the jackshaft 51. A reverse drive is effected by shifting the gear 41 into engagement with the intermediate 54 meshing with the gear 55 fast to the jackshaft. The levers or means for shifting the gears 40 and 41 may be of the usual construction.

Fig. 6 shows a modification of the drive mechanisms shown in Fig. 1. In this case, the eccentric reduction gears and differential gears are mounted to one side of the axis of the shaft 6. The driven wheel axles 2 and 3 are connected by the differential gearing 56, and the housing 57 which carries the pinions 58 of the differential gearing is rigid with a rotatable bell member 58 similar in construction to the member 20 shown in Fig. 1 and driven by link connections 59, the same as shown in Fig. 3, with an eccentric gear 60. The gear 60 is identical in structure with the gear 25 shown in Fig. 1 and likewise meshes with a stationary internal gear and is driven by an eccentric 61 fast to a sleeve 62 secured to the large beveled gear 63. The beveled gear 63 receives motion from a pinion 64 fast to the shaft 6.

In the modified arrangement shown in Fig. 4, the eccentric gear reduction is similar in construction and operation to that shown in Fig. 1, and the corresponding parts are given the same reference numerals, the difference being mainly that the shafts 2 and 3 are extended through the hubs 37 of the driven wheels 38, and the gearing is mounted on the outer ends of said shafts. The form of the member 20 is altered to suit the different location, and this member, instead of being secured to an axle, is bolted directly to the wheels by the bolts 39.

In the operation of the device, the power may be transmitted from the engine through the speed changing gear shown in Fig. 5, at varying speeds. The normal engine speed may be transmitted direct to the shaft 6 or at different increased speeds through the jackshaft 51, according to the location of the shiftable gears 40 and 41. From the shaft 6, motion is communicated to the shafts 15 and 16 through a well known form of differential gearing. The rotation of the shafts 15 and 16 through the eccentrics 24 thereon causes the external gears 25 to roll on the fixed internal gears 22. The extent of rolling motion is determined by the difference in number of teeth between the gears 25 and 22, and each rotation of the shafts 15 and 16 will result in but a partial angular motion of the gears 25. For example, it may require fifteen rotations of the shafts 15 and 16 to produce one rotation of the eccentric gears 25 on other axes. The bodily or eccentric motion of the gears 25 is lost by an idle rocking of the pivoted link connection between these gears and the driven members 20, whereas the rotation of the gears 25 through this link connection is imparted to the members 20, the latter turning on the shafts 15 and 16 in exact accordance to the rotation of the eccentric gears. The bell-shaped members 20, being rigid with the driven wheel shafts 2 and 3, serve by this direct connection to drive the vehicle wheels, as appears in Fig. 4.

In the construction shown in Fig. 6, the operation is similar to that described, except that the power is first transmitted through the eccentric gear reduction and then through the differential mechanism to the driven shafts 2 and 3, whereas in the arrangement shown in Fig. 1, the power passes through the differential mechanism before it is delivered to the eccentric reduction gearing.

Figure 7:
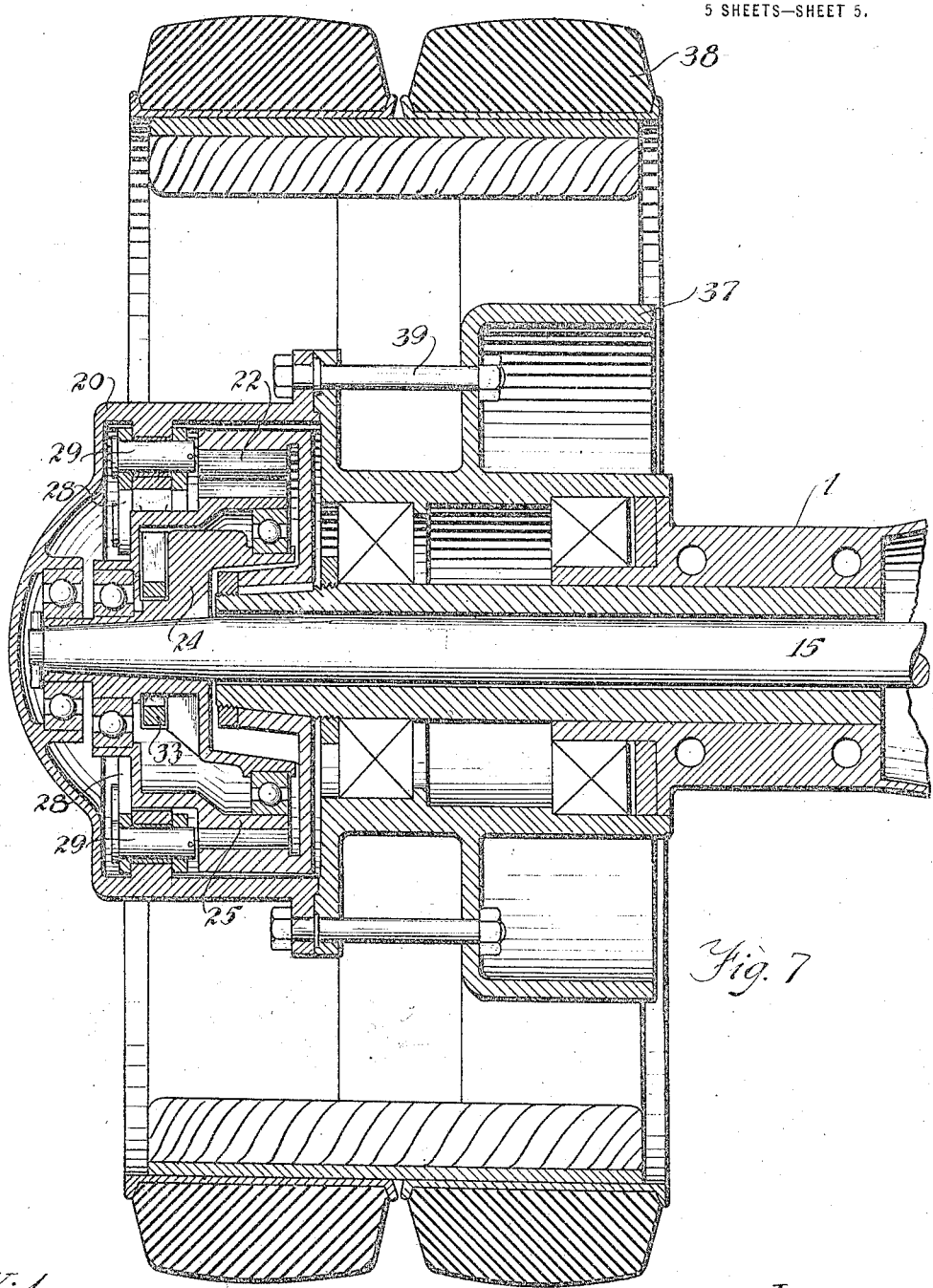
Fig. 7 is a sectional view illustrating a slightly modified arrangement of the reduction gearing.

In the construction shown in Fig. 7, the operation is precisely the same as with the construction shown in Fig. 1, the gearing being arranged in the same order, except that the eccentric gearing is mounted on the outer ends of the wheel axles. This arrangement permits a convenient access to the gearing.

It may be seen from the foregoing that the present invention provides a reduction gearing all mounted in alinement with the driven axles of the vehicle and that the final, permanent reduction is brought about by the eccentric gearing, which, as is well known, may by a single pair of gears bring about a very great reduction and is powerful and practically free from friction losses.

The differential gearing shown in the drawings is driven by the well known right angle arrangement of beveled gears, but other types of gearing might be substituted for these beveled gears, such as the ordinary worm and worm wheel, because their inherent friction losses are not so important when at the high speed end of the transmission mechanism.

An important point in this invention is that eccentric gearing is employed at the final drive, where the heaviest work is performed and where it is desired to have the minimum friction or gear losses.

Although but one specific embodiment of this invention has been herein shown and described, it will be understood that numerous details of the construction shown may be altered or omitted without departing from the spirit of this invention as defined by the following claims.

I claim:—

1. A drive mechanism of the class described, comprising intermeshing internal and external gears, means for imparting an eccentric motion to one of said gears whereby it is caused to roll on the remaining gear, a driven member, connections between said driven member and the gear which is given the eccentric motion, said connections comprising a plurality of links which are pivoted to said gear, and a plurality of links which are pivoted to said driven member, and a plate pivotally connecting the opposite ends of all the links.

2. A drive mechanism of the class described, comprising a power shaft, a driven shaft, eccentric reduction gearing between said shafts, said gearing comprising intermeshing internal and external gears, means for imparting an eccentric motion to one of said gears, a plurality of links pivoted to said gear which receives the eccentric motion, a non-eccentric member, a plurality of links pivoted to said non-eccentric member, and a member pivotally connecting the opposite ends of all of said links.

3. A drive mechanism of the class described, comprising a power shaft, differential gearing arranged to be driven by said shaft, a pair of shafts driven by said differential gearing, an eccentric mounted on each of said driven shafts, a gear rotatably mounted on each of said eccentrics, stationary gears meshing with the gears mounted on said eccentrics, driven members, and connections between said driven members and said eccentric gears, said connections each comprising a member connected by pivoted links respectively to said eccentric gears and the driven members.

4. In a device of the class described, a power shaft, a driven shaft, an eccentric gearing connecting said power shaft and driven shaft, said eccentric gearing comprising intermeshing internal and external gears, means for imparting an eccentric motion to one of said gears, a non-eccentric member and a connection between said non-eccentric member and the gear which is given an eccentric motion, said connection comprising links and a member for connecting said links, one pair of links extending in opposite directions from said member to the non-eccentric member, and another pair of said links extending in opposite directions from said member to the gear which is given the eccentric motion.

5. A drive mechanism of the class described comprising intermeshing external and internal gears, a member mounted to rotate on the axis of one of said gears and carrying the other said gear for rotation about an axis eccentric to said first named gear, and a counterweight arranged on said member to balance the weight of the eccentrically disposed parts.

6. A drive mechanism of the class described, comprising intermeshing external and internal gears, a member mounted to rotate on the axis of one of said gears and carrying the other said gear for rotation about an axis eccentric to said first named gear, a counterweight arranged on said member to balance the weight of the eccentrically disposed parts, and bearings arranged between said member and said one gear and spaced apart axially at both sides of said counterweight.

Signed at Chicago this 20th day of March, 1917.

JOHN KROHN.